United States Patent [19]
Daane et al.

[11] 3,946,502
[45] Mar. 30, 1976

[54] PARISON OVEN HAVING ADJUSTABLE CEILING

[75] Inventors: Robert A. Daane, Rockton, Ill.;
Edward D. Beachler; Raymond C. Vonderau, both of Beloit, Wis.;
Nickolas N. Sokolow, Roscoe, Ill.

[73] Assignee: Beloit Corporation, Beloit, Wis.

[22] Filed: Aug. 16, 1974

[21] Appl. No.: 498,080

[52] U.S. Cl. .................. 34/231; 110/1 A; 432/247
[51] Int. Cl.² ........................................ F26B 19/00
[58] Field of Search ........... 432/247, 249, 3, 5, 137; 34/231; 110/1 A

[56] References Cited
UNITED STATES PATENTS

| | | | |
|---|---|---|---|
| 491,075 | 2/1893 | Byrne | 34/231 X |
| 1,452,496 | 4/1923 | Ferrara | 34/231 |
| 2,262,960 | 11/1941 | Osterman | 432/249 |
| 2,430,477 | 11/1947 | Morton | 432/12 |
| 3,322,413 | 5/1967 | Orth | 432/5 |
| 3,784,354 | 1/1974 | Verhey | 432/3 |

FOREIGN PATENTS OR APPLICATIONS

| | | | |
|---|---|---|---|
| 805,646 | 8/1936 | France | 432/137 |

*Primary Examiner*—John J. Camby
*Attorney, Agent, or Firm*—Dirk J. Veneman; Bruce L. Samlan; Gerald A. Mathews

[57] ABSTRACT

An oven for uniformly heating parisons to a target temperature, including a movable wall portion which is raised and lowered to accommodate parisons of various axial lengths. The movable portion maintains a confined flow path to minimize stray air currents.

1 Claim, 3 Drawing Figures

PARISON OVEN HAVING ADJUSTABLE CEILING

BACKGROUND OF THE INVENTION

This invention relates to blow molding of oriented hollow articles of thermoplastic material and more specifically to an oven for heating parisons to a predetermined temperature.

In recent years, there has developed techniques whereby blow molded articles are produced having biaxial orientation, which articles have exceptional strength and highly desirable physical properties such as clarity. This technique involves forming a parison, cooling it to well below its melting point, and thereafter heating it to its orientation temperature. The orientation temperature is just below the crystalline melt point in the case of crystalline materials and 40° to 225° F. below the homogeneous melt point for amorphous materials. Such techniques are disclosed in U.S. Pat. Nos. 3,288,317 and 3,390,426.

Ovens for heating such parisons can be found in U.S. Pat. Nos. 3,752,641; 3,740,868; and 3,801,623, and in co-pending application U.S. Ser. No. 473,290, filed May 24, 1974, all of the above assigned to the assignee of the present invention. Generally, tubular parisons are carried on pin structures on a movable chain through the oven. As will be readily appreciated from a review of the prior art cited above, the two major problems relating to the oven are: the time it takes to heat certain materials, such as polypropylene, and uniformly heating the inner and outer parison walls along the axial length of the parison. In U.S. Ser. No. 473,290, said application hereby being incorporated by reference, the velocity of the heating fluid is increased to the distortion velocity of the parisons, and a tempering zone was added to reduce the heating time to equalize the temperatures of the inner and outer walls of the parisons. But, the prior art ovens do not provide for uniformly heating parisons which have various axial lengths. The oven was designed to heat the parisons of a predetermined maximum length, but in doing so, when parisons of a predetermined minimum length are heated, large stray currents occur which result in a nonuniform heating environment. The resultant bottles of the smaller lengths are often unsatisfactory.

What is desired then is a parison oven which can minimize the stray heating air currents within the oven and provide a uniform temperature profile to parisons of various axial lengths to uniformly heat the same.

SUMMARY OF THE INVENTION

In accordance with this invention, an oven is provided for heating tubular thermoplastic parisons, the oven including a ceiling wall member, a floor wall member, and four side wall members which cooperatively define the heating plenum. Heating fluid is supplied to the plenum from one of the side wall members. At least a portion of the ceiling wall member adjacent the heating fluid supply means is movable independently of the side wall members. Power means are provided to move at least a portion of the ceiling wall member of the oven. The ceiling wall member can then be raised or lowered to expand or restrict the flow path of heating fluid through the plenum. For smaller size parisons, the ceiling wall member is lowered to confine the flow path of the heating fluid to be closely adjacent the top portion of the parisons. For larger size parisons, the ceiling wall member is raised to allow the parisons to pass through the oven and yet still confine the flow path of heating fluid to a position closely adjacent the top portion of the parisons. This substantially reduces the stray air currents, and provides for an improved temperature profile through the oven.

Although only one embodiment has been shown, it will be obvious to those skilled in the art that modifications can be made without departing from the spirit and scope of the invention.

DETAILED DESCRIPTION OF THE INVENTION

Figure 1:
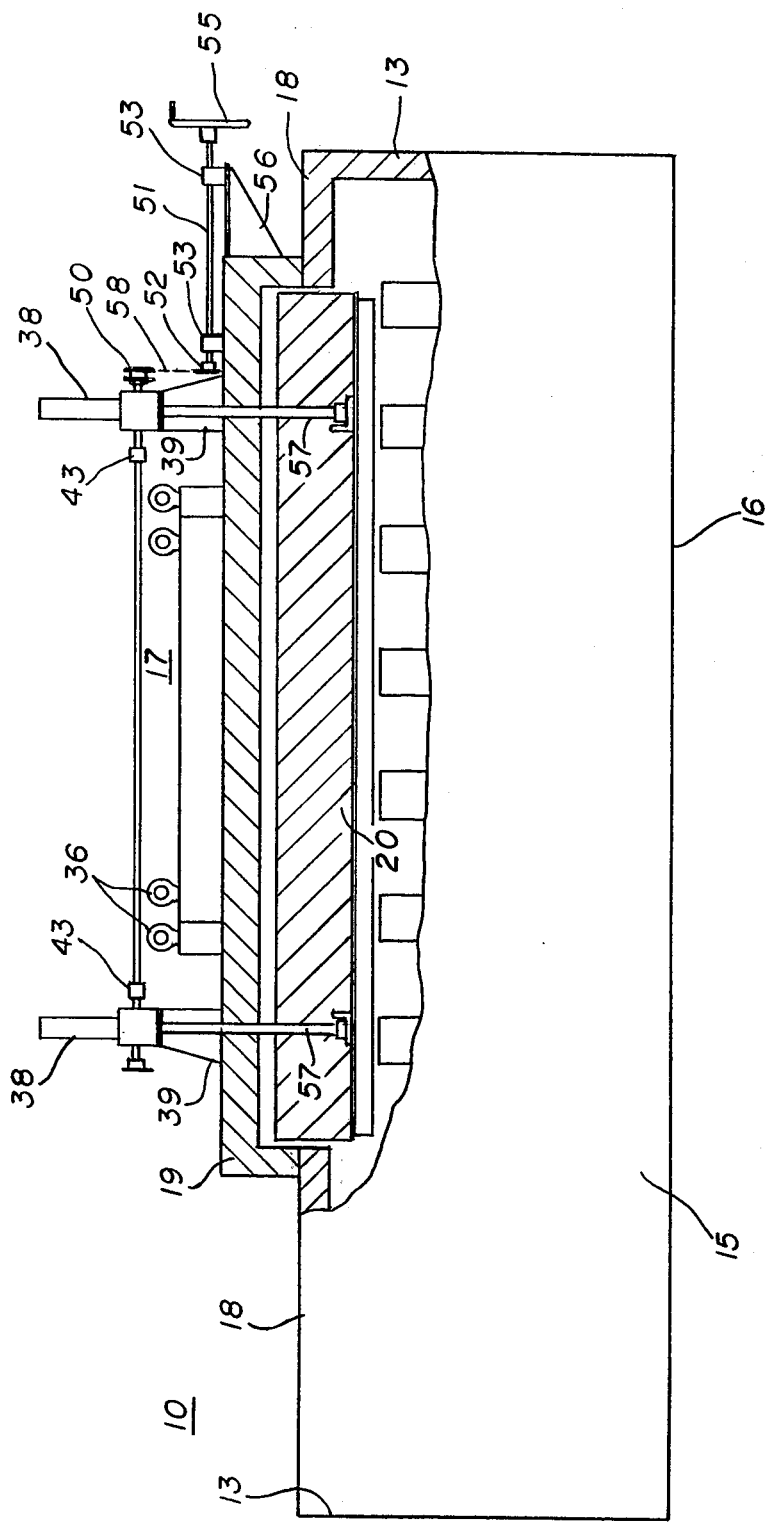
FIG. 1 is a front elevational view partly in section of an oven formed in accordance with the principles of the present invention.
Figure 2:
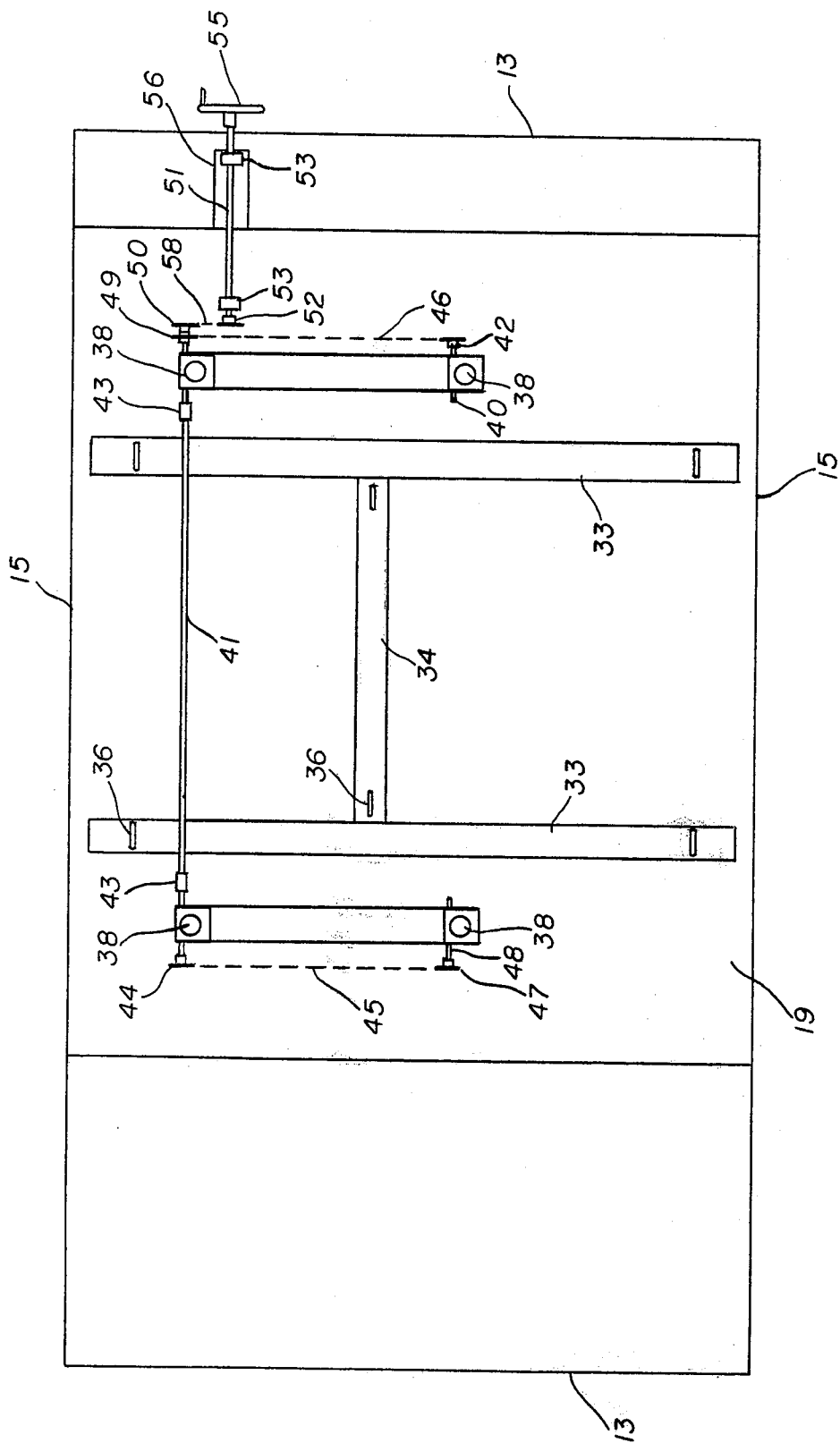
FIG. 2 is a plan view of the oven in FIG. 1.

Referring to the drawings, and more specifically to FIG. 1, there is generally shown an oven structure 10. The oven 10 is generally comprised of two opposed insulated side wall members 13 and two opposed insulated side wall members 15, (FIG. 2).

The bottom portion of the oven is defined by an insulated floor wall member 16. A ceiling wall member 17 includes an insulated fixed wall portion 18 which is secured to the side wall members 13. The ceiling wall member also includes an insulated cover portion 19 which cooperated with the fixed wall portion 18 to define the upper ceiling portion of the oven. A movable wall portion 20 is disposed within the cover portion 19 and forms part of the lower ceiling of the oven.

Figure 3:
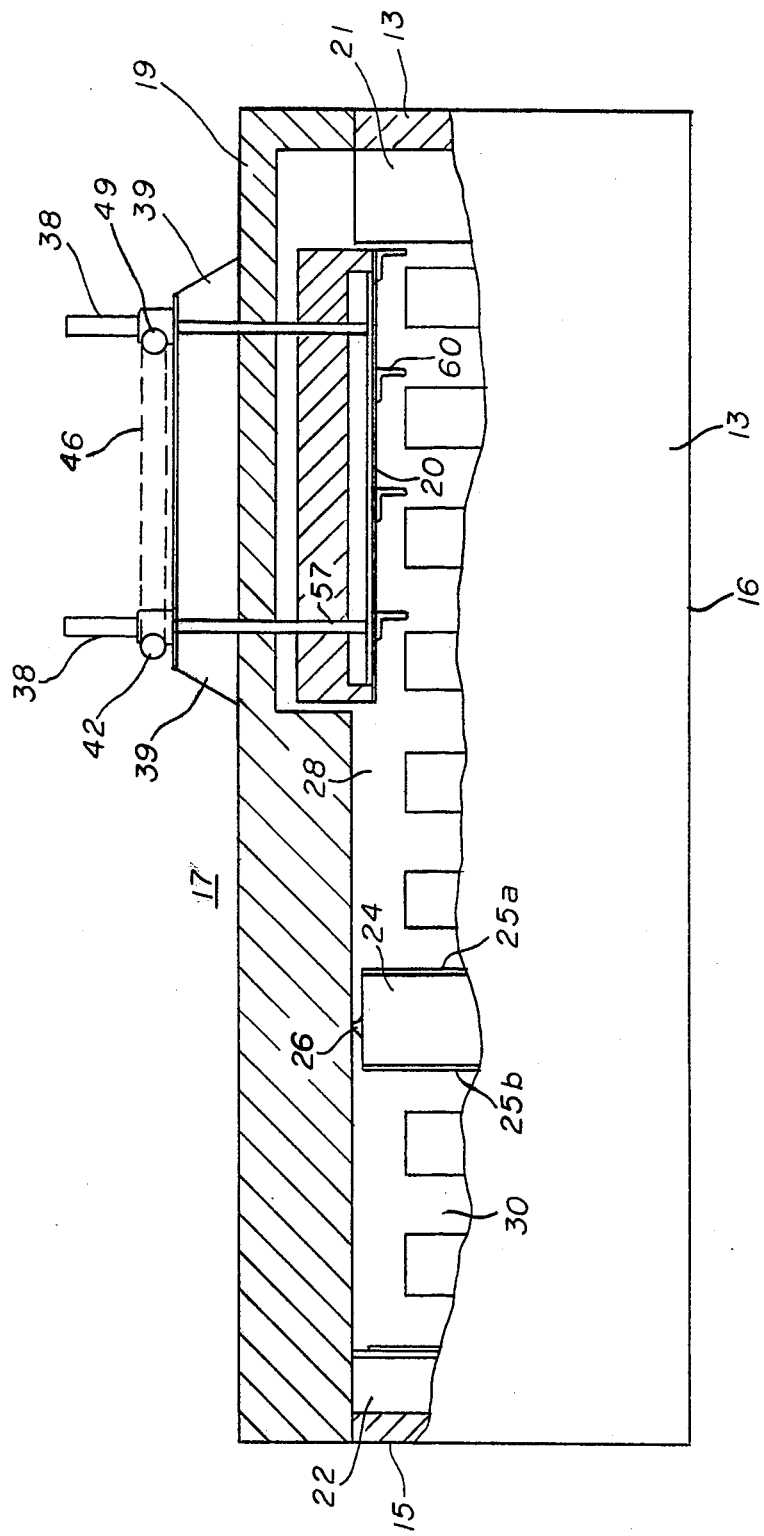
FIG. 3 is a side elevational view partly in section of the oven shown in FIG. 1 and on an enlarged scale.

Referring to FIG. 3, it can be seen that a first high pressure plenum 21 is disposed on side wall 15. The plenum 21 has a perforated plate facing the interior of the oven. An intermediate pressure plenum 22 is disposed upon the opposing wall 15 and has a perforated plate facing the interior of the oven.

An exhaust chamber 24 is disposed between the high pressure plenum 21 and the intermediate pressure plenum 22. The exhaust chamber 24 has suitable perforated plates on each side 25a and 25b to receive air from the plenums 21 and 22 respectively. A suitable seal structure 26 is disposed between the exhaust plenum 24 and the top wall 19. The plenum 21 and the exhaust chamber 24 define a first heating zone 28. The plenum 22 and the exhaust chamber 24 define a second zone 30 for tempering of the parisons.

The cover portion 19 has two parallel support structures 33 (FIG. 2) connected at its intermediate section by support structure 34. A plurality of eyebolts 36 are secured to the support structures 33 and 34 for easy removal of the cover portion 19. Four lifting jacks 38 are secured to the cover portion and are supported on bracket structures 39.

A cross shaft member 41 is disposed between two of the lifting jacks 38. The shaft 41 is rotatably connected to the jacks 38 through couplings 43. Secured to one end of the cross shaft 41 is sprocket 44. Sprocket 47 is secured to shaft 48 and chain member 45 is connected to sprockets 44 and 47.

Secured to the other end of shaft 41 are sprockets 49 and 50. Shaft 40 activates jack 38 and has sprocket 42 secured thereto. Chain 46 is rotatively secured to sprockets 42 and 49.

Bracket 56 supports shaft 51 between bearings 53. Bracket 56 is secured to the cover portion 19. Handwheel 55 is secured to one end of the shaft 51 and sprocket 52 is secured to the other end of the shaft. Chain 58 is secured to sprockets 50 and 52. All of the sprockets 42, 44, 47, 49, and 50 are on the same vertical level. The cover portion and the apparatus to control the movable wall portion is outside of the oven and is secured to the cover portion so that when the cover is removed no disassembly is necessary to allow access to the inside of the oven.

As best seen in FIGS. 1 and 3, each lifting jack 38 has a rod member 57 projecting down through the cover portion 19, and being fastened at the bottom of the movable wall portion 20. The rod members 57 are slidable within the cover portion 20 to move the wall portion 20 relative to the cover portion. The wall portion 20 is positioned within the first heating zone 28 and covers four rows of parisons within the first heating zone (FIG. 3).

Suspended from the wall portion 20 and projecting towards the interior of the oven is a plurality of angle members 60. The angle members correspond to the first four rows of parisons.

In operation, a plurality of parisons are fed to a conveying device (not shown) in the first heating zone 28. High velocity heating fluid is supplied to the zone 28 through plenum 28 and exits through exhaust chamber 24. Pressurized fluid is supplied to the second zone 30 from plenum 22 and exits through the opposite side of exhaust chamber 24. The parisons are conveyed through six serptinuous rows within the first heating zone and are then conveyed through two rows in the second zone 30 where they are uniformly tempered to a target temperature. This is more fully described in previous cited application, Ser. No. 473,290.

For smaller size parisons, the handle 55 is turned which turns shaft 51, sprocket 52, chain 58, sprockets 50, 49, 42, 44, 47 and chains 45a and 46 to actuate the lifting jacks 38. This lowers the corresponding rods 55. Since the jacks 38 and rods 57 are at the same height, the movable wall portion 20 is moved downwardly evenly and parallel to the bottom wall 16 of the oven. This, therefore, funnels the heating air for the first four rows to a close proximity to the top portions of the parisons. For the larger size parisons, handwheel 55 is rotated in the opposite direction thereby raising the rods 55 of the lifting jacks 38. The movable wall portion 20 thereby rises allowing for passage therethrough of the larger size parisons and a controlled heating flow path.

The effect of having variable control of the flow path allows for much more efficient heat transfer between the heating air and the parisons. Higher velocity air flow is more uniformly maintained during the most critical heating period. The air is substantially controlled and prevented from residing in the previously vacant upper portion of the oven. Eddy currents or stray currents are substantially reduced and again the heat transfer effectiveness is increased. Therefore, this results in more efficient heat transfer and a more uniform heating of the parisons.

It will be further noted that a plurality of angle members 60 can be attached under some specific conditions to the movable wall portion 20. The parisons, which are open at the top tend to get a turbulent flow of heated air which enters through the top portion of the parison. This creates more heat transfer at the top portion of the parison than in the middle and bottom portion in the parison. By providing angle members or shield members, the speed and the turbulence of the air near the top of the parisons can be controlled to equalize transfer of heat to the parisons.

Although only one embodiment has been shown, it is intended that all matter contained in the foregoing description or shown in the accompanying drawings shall be interpreted as illustrative and not in a limiting sense.

What is claimed is:

1. An oven for heating thermoplastic parisons of various lengths, said oven including:
    a ceiling wall, a bottom wall, and four side walls cooperatively defining a heating zone;
    a high pressure plenum structure being defined on one of said side walls;
    means to supply heating fluid to said plenum structure and into said heating zone;
    said ceiling wall being adjacent to said high pressure plenum structure defined on one of said walls;
    said ceiling wall including a cover portion and a movable wall portion;
    means to activate said wall portion to increase and decrease the flow path of the heating fluid;
    said activating means maintaining said movable wall portion equally spaced from said bottom wall;
    said activating means being mounted to said cover portion;
    said activating means being equally spaced from the bottom wall of the oven and including rod members secured to the movable wall portion;
    said rod members maintaining the movable wall portion at an equal height from said bottom wall; and
    a cross shaft member rotatably connected to said activating means to simultaneously actuate said activating means and move the movable wall portion to an equal height from the bottom wall.

* * * * *